United States Patent [19] [11] 4,240,831
Ro et al. [45] Dec. 23, 1980

[54] CORROSION-RESISTANT POWDER-METALLURGY STAINLESS STEEL POWDERS AND COMPACTS THEREFROM

[75] Inventors: David H. Ro, Cleveland Heights; Erhard Klar, Beachwood; Charles I. Whitman, Bay Village, all of Ohio

[73] Assignee: SCM Corporation, New York, N.Y.

[21] Appl. No.: 10,956

[22] Filed: Feb. 9, 1979

[51] Int. Cl.$^3$ .................................................. B22F 3/00
[52] U.S. Cl. .................................. 75/228; 75/0.5 BA; 75/0.5 C; 75/200; 75/211; 75/224
[58] Field of Search ................ 75/0.5 BA, 0.5 C, 200, 75/211, 224, 228

[56] References Cited

U.S. PATENT DOCUMENTS

| | | | |
|---|---|---|---|
| 3,243,288 | 3/1966 | Feldmann et al. | 75/0.5 BA |
| 4,154,608 | 5/1979 | Carey et al. | 75/0.5 BA |

*Primary Examiner*—Brooks H. Hunt

*Attorney, Agent, or Firm*—Merton H. Douthitt; Gordon P. Becker

[57] ABSTRACT

Disclosed is a process for improving the corrosion resistance of a stainless steel powder or compact thereof wherein said powder is produced by atomizing a melt of metals in an oxidizing environment whereby the resulting stainless steel powder is surface-enriched in silicon oxides. The process comprises adding an effective proportion of modifier metal to said melt prior to said atomization, said modifier metal selected from the group consisting of tin, aluminum, lead, zinc, magnesium, rare earth metals and like metals capable of enrichment about the surface of said resulting atomized stainless steel powder and effective under reductive sintering conditions in the depletion of said silicon oxides about said surface; and sintering said resulting atomized powder or a compact thereof under reducing conditions, said sintered powder or compact thereof being depleted in said silicon oxides and the corrosion resistance of said powder or compact thereof being improved thereby.

5 Claims, No Drawings

CORROSION-RESISTANT POWDER-METALLURGY STAINLESS STEEL POWDERS AND COMPACTS THEREFROM

BACKGROUND OF THE INVENTION

The present invention relates to powder metallurgy (P/M) stainless steel powders and compacts therefrom, and more particularly to improving the corrosion resistance of such powders and compacts.

Heretofore, poor corrosion resistance of such compacts has been attributed mainly to the porosity found within the compacts, thus most techniques for overcoming corrosion problems have been aimed at closing the porosity. Prior techniques aimed at minimizing the surface porosity of the compacts made from such stainless steel powders include mechanical closure treatment, plastic impregnation, surface coatings, or passivation treatments. Each of these techniques has some limitation as to its effectiveness in addition to raising the cost of the final product. Other proposals aimed at improving the corrosion resistance of stainless steel powder compacts concentrate on compacting and sintering parameters. These proposals generally state that the sintering conditions and sintering atmosphere have a marked influence on the corrosion properties of the powder compact; however, most of the experimental results reported in these proposals are inconsistent. For example, Kalish and Mazza ("An Evaluation of Dissociated Ammonia and Hydrogen Atmospheres for Sintering Stainless Steel", *Journal of Metals*, TRANS. AIME, February 1955, pages 304–310) state that sintering in hydrogen provides a more corrosion-resistant compact than sintering in dissociated ammonia which gives rise to a fourfold increase in the corrosion rate of the compact. Stosuy et al (*Metal Progress*, Vol. 91, pages 81–85, 1967) and Jones ("The Effect of Processing Variables on the Properties of Type 316L Powder Compacts", *Progress in Powder Metallurgy*, Vol. 30, pages 25–50, April 1974) report that an optimum combination of mechanical properties and corrosion resistance of the compact can be obtained by sintering the compact in dissociated ammonia. Furthermore, Sands et al ("The Corrosion Resistance of Sintered Austenitic Stainless Steel", *Modern Developments in Powder Metallurgy*, Vol. 2. H. H. Hausner, ed., Plenum Press, New York, N.Y., pages 73–83, 1966) report that while sintering in vacuo always gives a good corrosion-resistant product, sintering in either dissociated ammonia or hydrogen can lead to loss of corrosion resistance. With respect to sintering in dissociated ammonia, there is some evidence which points to the probable formation of chromium nitrides during cooling of the resultant dissociated ammonia-sintered compact which results in localized chromium depletion and, thus, loss of effective corrosion protection of the sintered compact. Certainly, the inconsistencies among these various citations demonstrate the confusion prevalent in the art with regard to the corrosion resistance of stainless steel powder and compacts made therefrom.

It now has been discovered that stainless steel powders atomized in an oxidizing environment (e.g. a conventional water atomization process) are surface-enriched in silicon oxides (primarily silicon dioxide) and, thus, surface-depleted in chromium. Such depletion or loss of chromium about or at the surface of the powder is believed to lead to the poor corrosion resistance of the powder and more importantly to the ultimate compact made from such powder. "Surface-enrichment" in this application means that the composition of the powder or compact about its surface is substantially different from the bulk composition of the powder with a marked increase of silicon oxides being located about the surface of the powder (or compact) or within close proximity to the surface (e.g. about 0.5 micrometers into the powder or compact from the surface). Effective removal of such silicon oxides (the term "silicon oxide" is intended to refer to the various forms of oxidized silicon which primarily is believed to be silicon dioxide, but is not intended to be a limitation of the present invention) about the surface provides unexpected superior corrosion resistance of the powder and compact made therefrom.

BROAD STATEMENT OF THE INVENTION

The present invention is a process for increasing the corrosion-resistance of stainless steel powder or a compact thereof wherein a melt of metals is atomized for producing stainless steel powder in an oxidizing environment whereby the resulting stainless steel powder is surface-enriched in silicon oxides. Such improvement comprises adding an effective proportion of modifier metal to said melt prior to said atomization, said modifier metal selected from the group consisting of tin, aluminum, lead, zinc, magnesium, rare earth metals and the like metals capable of enrichment about the surface of said resulting atomized stainless steel powder and effective under reductive sintering conditions in the depletion of said silicon oxides about said surface; and sintering said resulting atomized powder or a compact thereof under reducing conditions, said sintered powder or compact thereof being depleted in said silicon oxides and the corrosion resistance of said powder or compact thereof being improved thereby.

DETAILED DESCRIPTION OF THE INVENTION

The presently preferred modifier metal is tin, and much of the description in this application will be directed to use of tin for illustration of the invention, and not by way of limitation. Other modifier metals include aluminum, lead, magnesium, and rare earth metals, for example, though it must be recognized that it is probable that other metals may be effective in improving corrosion resistance of atomized stainless steel powders also. When added to the stainless steel alloy melt, tin is found to be enriched about the surface of the resulting atomized stainless steel powder, though no satisfactory explanation for this surface-enrichment presently is known. Similarly, aluminum and lead become surface-enriched about the powder. Currently, there is no satisfactory understanding as to why these dissimilar metals perform in the stainless steel alloy as they do. Thus, expansion of suitable modifier metals appears achievable by experiment only. Set forth in this application will be characteristics of suitable modifier metals of the invention and details of experimental procedures whereby other candidate modifier metals can be tested and their suitability for use in the process adjudged. Certainly, those involved and skilled in this powder metallurgy stainless steel powder art will recognize the test procedures and will have the professional expertise to conduct such tests according to the disclosure of this invention.

The first characteristic of the modifier metal is that it becomes enriched about the surface of the resulting atomized stainless steel powder. Suitable modifier metals apparently should have high diffusivity and low solid solubility in the stainless steel alloy for surface-enrichment, though all modifier metals may not possess both of these characteristics yet still be quite useful in the invention. By surface-enrichment is meant that the weight concentration of the metal about the surface of the powder is substantially more than the bulk weight concentration of the metal in the alloy composition. Also, surface-enrichment includes the surface and about 0.01 and up to about 1 micrometer into the powder itself. Tin is found surface-enriched about the powder and is found as an oxide following atomization of the melt. Other modifier metals may reside as oxides or even mixed oxides, or in elemental form about the surface of the resulting atomized powder. It is believed that surface-enrichment is important for successful practice of the invention and not the particular form taken by the modifier metal.

The second condition is that the modifier metal promotes the depletion of silicon oxides from the surfaces of the stainless steel powder or compact thereof. Even with tin, it is not known whether the silicon oxides are reduced to silicon monoxide, for example, and volatilized from the stainless steel during sintering, or are reduced to elemental silicon which rediffuses into the powder or compact thereof during the sintering operation. Likely, both of these results are occurring. Of importance, only, is that the silicon oxides be depleted from the surfaces of the powder or compact thereof and it appears of little, if any, significance whether the silicon itself is removed from the stainless steel or remains in its elemental form.

While various theories can be propounded as to why tin and like modifier metals operate in the process, a precise reaction mechanism presently is unknown. A possible explanation is that the modifier metal or an oxide thereof may act as a catalyst for removal of silicon oxides from stainless steel powder. Possibly other reaction mechanisms or even combinations thereof explain the process. Regardless of the explanation, the results are of importance and are readily determinable. It should be appreciated that the analyses for required for atomized stainless steel powders which are very small in size are directed just on the surface of such particles. Also, concentrations are in parts per million of a metal or oxide on such surface. Gathering of precise data, therefore, is difficult.

Other desirable, though not necessary, properties of the modifier metal should be recognized, especially for good commercial practice of the invention. Preferably, the modifier metal should not adversely effect the mechanical properties of the compacted part, such as transverse rupture strength or the like. Also, such modifier metal should be non-staining and not interfere with the compacting operation. A decided benefit of the invention is that compacting of the stainless steel powder is improved by practice of the process so that, for example, lower compacting pressures can be used. Further, it is implicit in the invention, of course, that the modifier metal or oxide thereof itself does not promote corrosion of the stainless steel powder or compact thereof.

The present invention is applicable to all types of stainless steel powders whether conventionally classified as ferritic, austenitic, or a specialty stainless steel powder. It is possible by the present invention to take a lower grade stainless steel powder and upgrade its corrosion performance to that of a more expensive stainless steel powder, which is an especially valuable feature of the invention. Major elements used in forming a stainless steel alloy powder are iron, chromium, and nickel with a wide variety of minor alloying elements being present, some for achieving desired mechanical and/or physical properties of the ultimate sintered part made from the stainless steel powder and some from adventitious sources, e.g. as impurities, and the like. Reference is made to the AISI Series of stainless steel grades for amplification on the particular elements comprising various stainless steel alloys suitably formulated into "powder metallurgy" (P/M) stainless steel powders.

Water atomization is the preferred manufacturing procedure for producing the stainless steel powders (a powder metallurgy process), though various gas atomization processes may be used. U.S. Pat. No. 2,956,304 depicts a typical water atomization apparatus and method for practice of this process. The stainless steel particles average size (weight average diameter) typically is less than 325 mesh though the distribution of particles ranges from finer than this on up to 100 mesh and larger (United States Standard Sieves Series).

Stainless steel powders than are compacted for forming a wide variety of parts. Compacting by consolidation, unidirectional die, isostatic techniques, rolling techniques, vibratory techniques, optionally with extrusion, all are suitable for forming parts from the novel stainless steel powders of the present invention. Further on compacting techniques can be found in Kirk-Othmer, *Encyclopedia of Science and Technology*, Vol. 16, 2nd Edition, pages 401–435, Interscience Publishers, New York, N.Y. (1968), the disclosure of which is expressly incorporated herein by reference. Densification from about 60% of theoretical on up to full dense parts are practiced conventionally and for the present invention. Formation of wrought articles from the stainless steel powder may be practiced also.

Because of the oxidizing-environment prevailing during the water atomization or like procedure (e.g. gas atomization with water or wet collection) used for manufacturing the stainless steel powders, the powder and a compact thereof are enriched in various oxides of some of the metals used to formulate the stainless steel alloy with some of these oxides enriched about the surface of the powder. The concentration of such silicon oxides about the surface of the powder typically is in a range of about 20% to 40% by weight. Reduction of such silicon oxides about the surface of the stainless steel powder unexpectedly provides substantial corrosion resistance to the stainless steel powder and compact thereof. It also should be noted that other oxides can form from the atomization process and some of these additionally may be enriched about the surface of the stainless steel particles. Such other oxides additionally can contribute to undesirable properties of the powder and such other oxides preferably are reduced simultaneously in the present invention. An example of such other undesirable metal oxide is manganese oxide which significantly contributes to discoloration of the stainless steel powder and compact thereof. Reduction of such other metal oxides may permit lower grade stock to be used in the alloy melt for making the stainless steel powders because the present invention substantially suppresses the adverse affect which such other metal oxides would otherwise display.

Experimental testing indicates that corrosion resistance of the stainless steel powder or compact thereof increases with decreasing proportions of silicon oxides about the surface of the powder. It appears that around 1000–2000 ppm silicon oxides and less, that substantial improvement in corrosion resistance results. Certainly, less than about 800 ppm silicon oxides about the surface of the powder is preferred. Again, precise values are difficult to determine due to analytical equipment limitations in accurately measuring such small quantities of metals (or oxides) on the surface of the powder.

Referring to reductive sintering, temperatures of at least about 2300° F. and dew points of lower than about −60° F. are most effective, yet extremely difficult and costly to achieve on a commercial scale. An advantage of the present invention is that relatively mild sintering conditions can be used to provide superior stainless steel parts. Accordingly, effective sintering conditions for the present invention include temperatures of about 2000° to 2200° F. with dew points not much lower than about −40° F. Most present commercial manufacturing plants easily and economically can handle such sintering conditions. Hydrogen gas is preferable for reductive sintering, though most commercial manufacturers find hydrogen gas expensive and often dangerous at the elevated temperatures of sintering. Accordingly, the present invention operates exceptionally using dissociated ammonia for the sintering operation. Furthermore, vacuum sintering may be employed at temperatures of about 2100° to 2500° F. in the presence of reagents or catalysts and the silicon oxides effectively removed. (See Samsonov, "The Oxide Handbook", Chapter 7, IFI/Plenum Data Corp., New York, New York, 1973; incorporated herein).

Another benefit of the invention is the improvement in compacting which the improved corrosion-resistant stainless steel powder of this invention provides. High dense parts can be pressed using relatively lower compacting pressures than heretofore could be used for powder metallurgy stainless steel powders. Superior full dense parts which possess excellent corrosion resistance are achievable with the present invention.

The following Examples will further elaborate and illuminate the present invention. Such examples show how the present invention can be practiced but should not be construed as limiting. In this application, all parts and percentages are by weight, all temperatures are in degrees Fahrenheit, and all other units are in the Metric System unless otherwise expressly indicated.

IN THE EXAMPLES

In the examples, the stainless steel powder tested was type 316L having the following typical chemical and sieve analyses:

TABLE 1

| Elements | Weight Percent |
|---|---|
| C | 0.019 |
| Si | 0.780 |
| Mn | 0.130 |
| S | 0.020 |
| Cr | 16.200 |
| Mo | 2.060 |
| Ni | 13.140 |
| Fe | Balance |

TABLE 2

| Powder Fraction (Tyler Mesh) | Weight Percent |
|---|---|
| >100 | 2.3 |
| 100/150 | 8.1 |
| 150/200 | 16.2 |
| 200/325 | 25.3 |
| <325 | 48.1 |

The powder was produced by a conventional water-atomization technique in a nitrogen atmosphere.

Specimens approximately 32×13×3 mm were compacted at 276–827 megapascals in a double-acting die set depending on the final part density desired (6.6±0.03 gm/cc). Normally, 1% lithium stearate was used as an admixed lubricant during compaction. Green compacts were subjected to a burn-off treatment at 1000° F. for 30 minutes in air prior to sintering. Sintering was conducted by placing the specimens in stainless steel boats.

Some corrosion tests were carried out by immersing specimens (degreased in trichloroethylene) in a 5% NaCl aqueous bath held at room temperature, optionally with 0.1 M $Na_2SO_4$ added to the bath. Other corrosion tests were 5% salt spray tests conducted according to ASTM B 117-64. The time at which the first sign of corrosion visually appeared on the immersed specimens then was recorded.

Surface analyses were performed using electron spectroscopy for chemical analysis (ESCA) and Auger electron spectroscopy (AES) techniques. ESCA work was conducted on the VIEE-15 electron spectrometer equipped with electrostatic analyzers (Varian Analytical Instrument Devices, Inc.). Auger analyses were performed on the AES system (PHI Model 510, Physical Electronics, Perkin-Elmer, Inc.) and the SAM/ESCA system (PHI Model 550). The latter system is a combination of the ESCA/Auger electron spectrometer and the scanning Auger microprobe (SAM).

EXAMPLE 1

Two batches of type 316L stainless steel powder were made, the first containing 0.2% by weight tin and the second containing 1.5% by weight tin added to the melt prior to atomization. Five samples each of these batches were tested for corrosion resistance along with five samples each of a conventional type 316L powder without any tin addition and a full dense wrought type 316L stainless steel. All samples were subjected to a 5% neutral salt spray test according to ASTM B 117-64 for 29 hours after which the samples were inspected for signs of corrosion. Each sample compacted part had been sintered at 2150° F. In dissociated ammonia with a −40° F. or lower dew point prior to the corrosion tests. The following results were obtained.

TABLE 1

| SAMPLE | FRACTION OF SAMPLE (% of Total) *DEGREE OF CORROSION | | | |
|---|---|---|---|---|
| | A | B | C | D |
| Regular 316L | 20 | 60 | 20 | — |
| Full Dense Wrought - 316L | 100 | — | — | — |
| 316L + 0.2% Sn | 80 | 20 | — | — |
| 316L + 1.5% Sn | 100 | — | — | — |

*A: No sign of corrosion
B: 1% surface corrosion
C: 2-25% surface corrosion
D: >25% surface corrosion The foregoing tabulated results clearly demonstrate the superior corrosion resistance of the stainless steel containing the additive metal tin. In fact, these results show the ability to manufacture compacted powder metallurgy stainless steel parts which have a corrosion resistance comparable to full dense wrought stainless steel.

EXAMPLE 2

Additional samples of the 1.5% by weight tin 316L powder were tested for corrosion against identical samples of 316L powder which contained the same proportion of tin as a coating on the atomized powder and as a separate powder mixed with the atomized powder. An aqueous bath containing 1 M NaCl and 0.1 M $Na_2SO_4$ held at room temperature was used and the time at which the first sign of corrosion which was detected was recorded. The following table contains the results.

TABLE 2

| Method of Tin Addition | Sintering Temp. (°F.) | Sintering Atm. | Sintered Density (g/cm$^3$) | Corrosion Time (hrs.) |
|---|---|---|---|---|
| Coating | 2050 | Hydrogen | 6.20 | 64 |
| Blending | 2050 | Hydrogen | 6.21 | 380 |
| Pre-Alloy | 2050 | Hydrogen | 6.52 | 2000 |
| Coating | 2050 | Dissociated Ammonia | 6.22 | 50 |
| Blending | 2050 | Dissociated Ammonia | 6.20 | 50 |
| Pre-Alloy | 2050 | Dissociated Ammonia | 6.55 | 700 |

The foregoing tabulated results clearly demonstrate the unexpected improvement in corrosion which the invention provides by the addition of tin to the melt of metals prior to atomization.

EXAMPLE 3

An additional sample of type 316L stainless steel powder was produced by a water atomization process. The melt contained 1.7% by weight of tin. Five compacts were formed from this powder (about 6.6 gm/cc density) and sintered at 2150° F. in dissociated ammonia atmosphere having a −40° F. dew point. After 29 hours of salt spray testing, no visible sign of corrosion was evident on the compacts. Surface analysis of the compacts (after corrosion testing) by the PHI Model 510 system gave the following results.

TABLE 3

| Element | Surface Concentration | *About 1000A into Compact |
|---|---|---|
| Si | 10.2 | 4.5 |
| Sn | 18.4 | 1.4 |
| Fe | 32.2 | 63.5 |
| Cr | 0.7 | 16.2 |
| Ni | 4.3 | 9.9 |
| Mo | — | 2.7 |
| C | 9.7 | 0.4 |
| O | 13.3 | 1.0 |
| S | — | — |
| Cl | 6.9 | — |
| Na | 4.3 | — |
| N | — | 0.4 |

*1500 seconds of Argon sputtering at a rate of approximately 0.6A/sec.

Prior testing indicated that regular water atomized type 316L stainless steel powder compacts contain about 30–40% by weight silicon on the surface. Thus, the surface concentration has been substantially reduced by the addition of tin. Furthermore, the above-tabulated results show the unexpected surface enrichment of tin in the powder compacts.

EXAMPLE 4

Additional water-atomized powders were made: (a) from a 316L alloy melt which contained lead; and (b) from a like alloy melt which contained aluminum. Each powder was analyzed and found to contain 0.01% by weight of lead and aluminum, respectively. Ten compacts from each powder were made and subjected to the salt spray test for 50 hours. The density of the compacts and sintering conditions were substantially the same as reported in Example 3. The following results were obtained.

TABLE 4

| SAMPLE | FRACTION OF SAMPLE (% of Total) DEGREE OF CORROSION[1] | | | |
|---|---|---|---|---|
| | A | B | C | D |
| (a) Pb Addition | 40 | 20 | 40 | — |
| (b) Al Addition | 60 | 10 | 30 | — |
| Regular 316L[2] | — | — | 80 | 20 |

[1] A: No sign of corrosion
B: 1% of surface corrosion
C: 2–25% surface corrosion
D: >25% surface corrosion
[2] Data for Regular 316L alloy samples was collected under the same conditions, but at a different time than the other samples in TABLE 4.

Clearly, aluminum and lead are suitable modifier metals for improving the corrosion resistance of stainless steel powder compacts. Of course, mixtures or even alloys of the modifier metals may be used.

We claim:

1. In a process for atomizing a melt of metals for producing stainless steel powder, wherein said atomizing is conducted in an oxidizing environment whereby the resulting stainless steel powder is surface-enriched in silicon oxides, the improvement for increasing the corrosion resistance of said powder or a compact thereof which comprises:

adding an effective proportion of modifier metal to said melt prior to said atomization, said modifier metal selected from the group consisting of aluminum, lead, zinc, magnesium, rare earth metals and like metals capable of enrichment about the surface of said resulting atomized stainless steel powder and effective under reductive sintering conditions in the depletion of said silicon oxides about said surface.

2. The process of claim 1 wherein said modifier metal is selected from the group consisting of aluminum, zinc, magnesium, lead, and rare earth metals.

3. The process of claim 1 wherein said sintered powder or compact thereof contains less than about 1000 ppm surface silicon oxides.

4. The powder product produced according to claim 1.

5. The compact of the powder product according to claim 1.

UNITED STATES PATENT AND TRADEMARK OFFICE
CERTIFICATE OF CORRECTION

PATENT NO. : 4,240,831
DATED : Dec. 23, 1980
INVENTOR(S) : David H. Ro, Erhard Klar, and Charles I. Whitman It is certified that error appears in the above-identified patent and that said Letters Patent are hereby corrected as shown below:

Col. 3, l. 45, before "required", delete "for".

Col. 5, l. 5, "1000-2000" should read --1000-1200--.

Col. 6, l. 53, "In" should read --in--.

Signed and Sealed this

Fifth Day of May 1981

[SEAL]

Attest:

RENE D. TEGTMEYER

Attesting Officer     Acting Commissioner of Patents and Trademarks